United States Patent

[11] 3,604,545

| [72] | Inventor | Claude Raymond Bourgeois<br>Annecy, France |
|---|---|---|
| [21] | Appl. No. | 854,576 |
| [22] | Filed | Sept. 2, 1969 |
| [45] | Patented | Sept. 14, 1971 |
| [73] | Assignee | Societe Nouville De Roulements<br>Annecy (Haute Savoie), France |
| [32] | Priority | Sept. 5, 1968 |
| [33] | | France |
| [31] | | 165,174 |

[54] SELF-ALIGNING CLUTCH BEARINGS WITH VIBRATION DAMPER
7 Claims, 12 Drawing Figs.

| [52] | U.S. Cl. | 192/98,<br>308/184, 192/30 V, 188/1 B |
|---|---|---|
| [51] | Int. Cl. | F16d 23/00 |
| [50] | Field of Search | 192/98, 110<br>B, 30 V; 308/184 |

[56] References Cited
UNITED STATES PATENTS

| 2,201,477 | 5/1940 | Chamberlin | 308/184 |
|---|---|---|---|
| 3,277,988 | 10/1966 | Pitner | 192/98 |
| 3,365,040 | 1/1968 | Pitner | 192/98 |
| 3,416,637 | 12/1968 | Maurice | 192/98 |
| 3,504,955 | 4/1970 | Bailey | 308/184 |

*Primary Examiner*—Benjamin W. Wyche
*Attorney*—Stevens, Davis, Miller & Mosher

ABSTRACT: The present invention is concerned with improved ball bearings for clutch mechanism, wherein the bearing races engaged by the balls are impressed in annular members consisting of rolled steel sheet to which a suitable contour is given, members being provided for incorporating the bearings in the clutch mechanism and possibly imparting a self-centering characteristic thereto, means being also provided for making said bearing self-lubricating and noiseless in actual service.

SELF-ALIGNING CLUTCH BEARINGS WITH VIBRATION DAMPER

This invention relates to improvements in or relating to clutch bearings and has specific reference to improvements in so-called self-centering and integral clutch bearings.

It is known that clutch bearings used notably in plate clutches of automobile transmissions consist of a rolling-contact bearing wherein an oblique contact is set up during the clutch release or withdrawal movement.

In bearings of this type the clutch control effort is transmitted to the clutch mechanism either through an external ring or hub formed with an insert or integral radial face, whether flat or not, or through the inner ring or hub relatively larger than the external one and having similarly an insert or integral end surface, flat or not. In constructions providing a direct contact between the thrust faces and a diaphragm-type clutch mechanism, toric surfaces are provided and the thrust bearings are generally of the self-centering type so that they are not strictly centered in relation to the shaft, the ring being positioned by the rotary motion set up in operation.

The design of these known clutch bearings is the same as that of a conventional bearing; therefore, their structure is relatively thick and they are not specially designed for constituting a suitable thrust bearing. Now in a vehicle the useful life of a clutch bearing is relatively short; by design, the useful life of a conventional thrust bearing is therefore exceedingly long and in any case out of proportion with its actual operating time. Moreover, these thrust bearings are heavy, cumbersome and noisy.

It is the essential object of the present invention to provide clutch bearings capable of avoiding the inconveniences set forth hereinabove, which is light in weight, has a low inertia and comprises low inertia ball races having a great resistance to wear and tear.

These self-centering thrust bearings, wherein the ball races consist of rolled steel sheet, are characterized in that the ball races are impressed in the steel sheet and the marginal portions of these races are adequately shaped, members being provided to permit the incorporation of the bearing in the clutch mechanism and possibly for self-centering the bearing; other means are also provided for ensuring their noiseless operation and imparting a permanent self-lubricating feature thereto.

Other features and advantages of this invention will appear as the following description proceeds with reference to the attached drawing illustrating diagrammatically by way of example various forms of embodiment of the invention. In the drawing.

Figure 1:
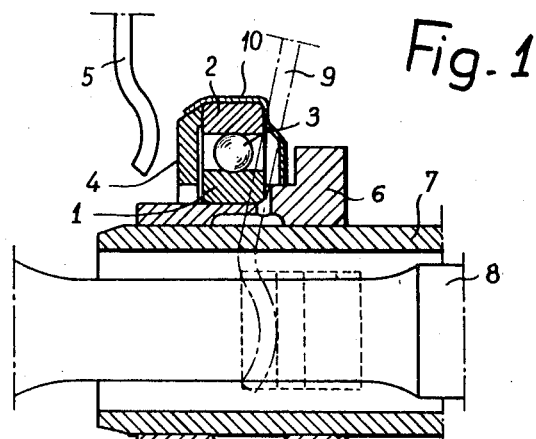
FIG. 1 is a diagrammatic axial section showing a known clutch bearing wherein the clutch release or withdrawal effort is transmitted via the outer race.

Referring first to FIG. 1, it will be seen that a known clutch bearing comprises an inner ball race 1 and an outer ball race 2 engaged by the balls 3. The outer race 2 is adapted to transmit the clutch release effort via a radial, insert forming or integral face 4, flat or not, to the clutch mechanism shown diagrammatically at 5. The inner race 1 is adapted to slide on the bearing-supporting sleeve 6 mounted on a socket 7 surrounding the transmission shaft 8. A clutch withdrawal fork 9 transmits to the bearing the movement of the clutch pedal (not shown). A protection sheath 10 holds the bearing components together.

Figure 2:
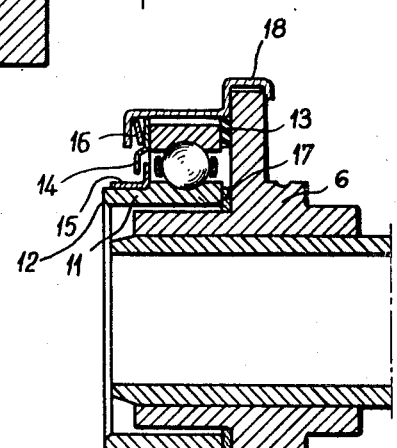
FIG. 2 is a diagrammatic axial section showing another known type of clutch bearing wherein the effort is transmitted via the inner race.

Referring now to FIG. 2, a known type of clutch bearing is shown wherein the clutch control effort is applied to the inner race 11. This inner race 11 is relatively longer than the outer race and if it is designed for engaging directly a diaphragm-type clutch mechanism it comprises a toric end face 12. The control effort is transmitted to the outer race via a sleeve and a friction lining washer 13. Baffle means 14, 15 associated with an inclined washer 16 and a felt washer 17 protect the bearing, the assembly being held together by an external protection sheath or casing 18.

Figure 3:
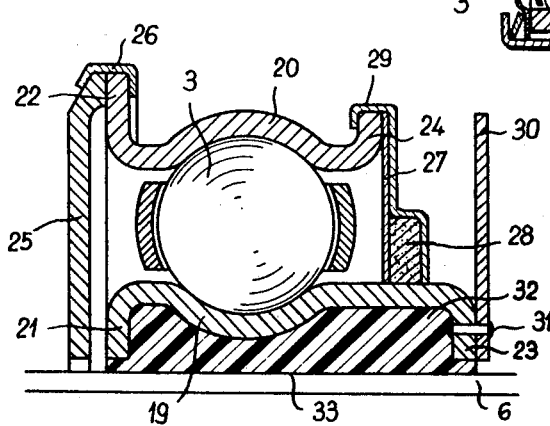
FIG. 3 is a fragmentary radial section showing an integral clutch bearing according to this invention, wherein the clutch release effort is exerted against the outer race.

In an integral bearing according to this invention, as illustrated in FIG. 3, the inner race 19 and outer race 20 are formed from rolled steel sheet shaped to constitute the races for balls 3. These ball races may also be simply impressed in the sheet material. Front marginal portions 21, 22 and rear marginal portions 23, 24 of the inner and outer races, respectively, are bent to constitute the side or end walls.

Secured to the front wall 22 of the outer race 20 is a plate 25 retained by crimping or otherwise, and adapted to transmit the clutch release or withdrawal effort. A sheath 26 encloses the outer edges of front wall 22 and plate 25. Secured to the rear wall 24 of outer race 20 is a washer 27 engaged by the annular packing or seal 28; this assembly is enclosed in a sheath-forming plate 29. Another plate 30 secured to the rear wall 23 of inner race 19 by means of rivets 31 or any other suitable fastening means is so designed that it is particularly well adapted to a clutch bearing control of the fork type (not shown) or of any other type causing the axial movement of the bearing along the bearing support 6.

The inner race 19 is filled with a suitable material capable of absorbing vibration and noise, and also of providing a permanent self-lubrication of the interface 33.

The above-described unitary construction permits simplifying the control members and dispensing with lubricating means.

Figure 4:
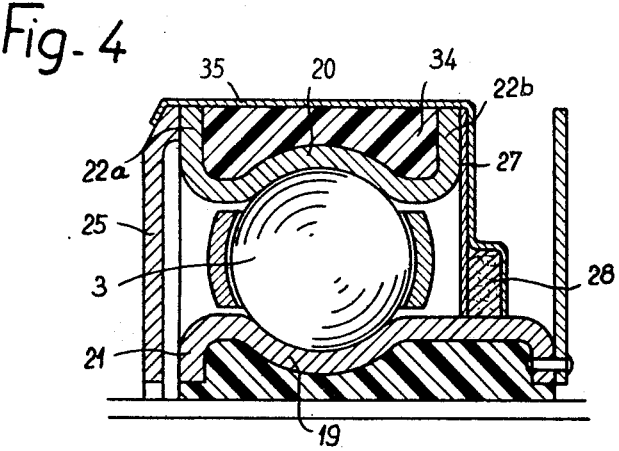
FIG. 4 illustrates a modified form of embodiment of the thrust bearing of FIG. 3, which comprises an outer cushioning member.

FIG. 4 illustrates a modified form of embodiment of the bearing of FIG. 3, wherein the outer race has two identical end faces 22a, 22b, and comprises an external filling 34 for attenuating the propagation of noise and vibration, so as to make the bearing operation perfectly noiseless. An outer sheath or casing 35 is provided for retaining the plate 25 and washer 27, and completing the sealing action of packing 28.

Figure 5:
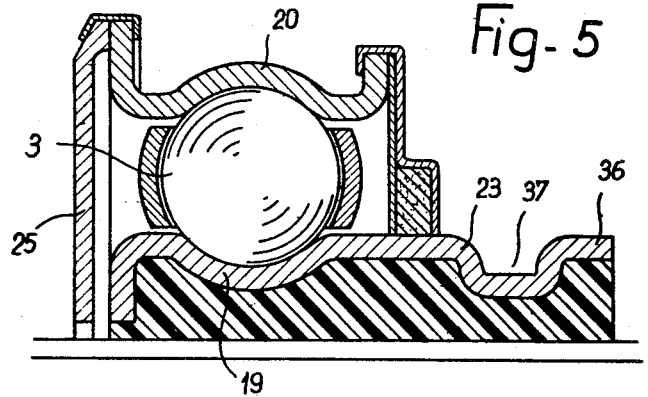
FIG. 5 shows a modified form of embodiment of an integral or unitary clutch bearing with a control insert.

FIG. 5 illustrates another modification of the structure shown in FIG. 3, wherein the end face 23 of inner race 19 has an extension 36 adapted to constitute a groove 37 in which the bearing control member can be fitted.

Figure 6:
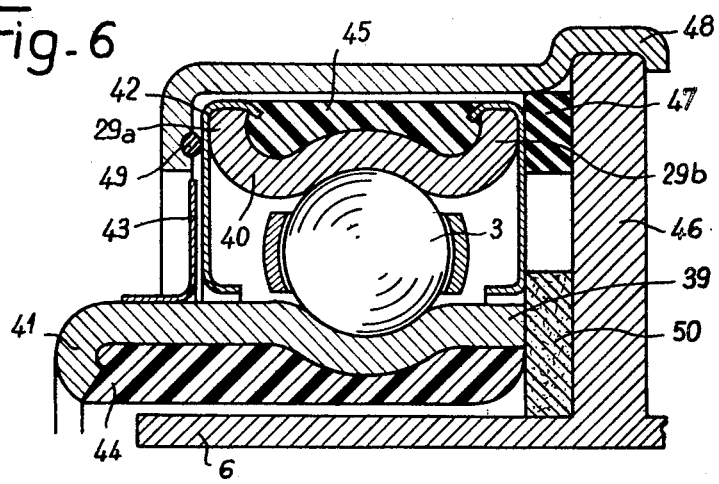
FIG. 6 is a similar view showing a self-centering clutch bearing according to this invention, wherein the control effort is transmitted to the inner race.

In a self-centered bearing illustrated in FIG. 6 the two inner and outer races 39, 40 respectively also consist of rolled steel sheet and are shaped to constitute race means for the balls 3. The front face 41 of the inner race 39 is bent to form a toric bearing face engaging the clutch plate. The two edges of the outer race 40 are curved to constitute the end faces 29a and 29b on which the baffle means 42 are crimped; another baffle member 43 is force fitted on the inner race 39. These baffles will thus safely protect the thrust bearing.

To damp out the noise resulting from the bearing operation, the cavities 44 and 45 of the inner and outer races are filled with a synthetic elastomer material capable of absorbing vibration.

In actual service this bearing is mounted on the bearing carrier member 6 and receives the axial thrust through a flange 46 of this carrier member 6 through the medium of a friction lining 47 engaging the outer race 40.

A sheath or casing member holds with a certain clearance the bearing components of which the protection is further improved by an O-ring 49 and an annular felt washer 50 disposed between the flange 46 and the edge of the inner race 39.

Figure 7:
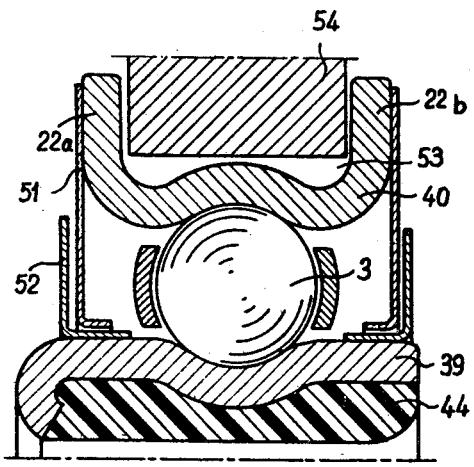
FIG. 7 shows a modified form of embodiment of a clutch bearing similar to the bearing of FIG. 6, but with a clutch control fork engaging directly the outer race of the bearing.

In the modified form of embodiment illustrated in FIG. 7, the outer race 40 is formed with radial end faces 22a and 22b. Baffle members 51 are either glued or welded to these end faces. A baffle member 52 is force fitted to each edge of the inner race 39.

The cavity 53 formed in the outer race 40 is free of any elastomeric material and thus adapted to receive directly a control fork 54 for actuating the clutch release mechanism and moving the bearing in either direction.

Figure 8:
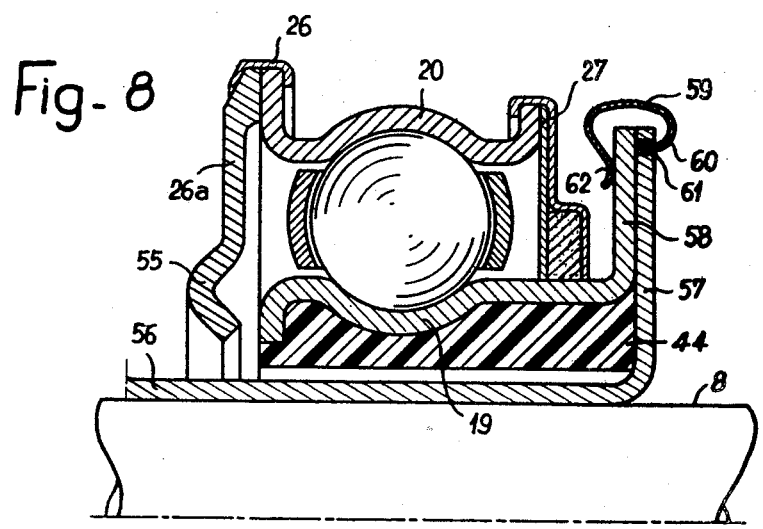
FIG. 8 shows a self-centering bearing forming a unitary structure with the means for transmitting the clutch release external effort to the outer race.

In a particularly advantageous form of embodiment of the self-centering and unitary thrust bearing of this invention, which is illustrated in FIG. 8, the plate 26a for transmitting the clutch withdrawal effort is secured to the outer race 20.

This plate has a toric surface 55 adapted to be centered in relation to the clutch diaphragm (not shown) by radially moving the bearing assembly on the guide member 56 of which the flange 57 is elastically fastened to the outer flange 58 of inner race 19.

To this end, the elastic assembling operation is performed by using for instance resilient hooks or clamps 59 having one end 60 engaged in a hole 61 formed in the outer end of flange 57 and the other curved end 62 resiliently pressed against the inner face of the flange 58 of inner race 19.

Figure 9:
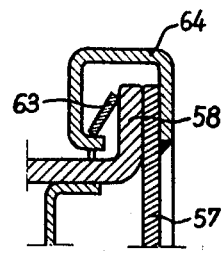
FIG. 9 shows a detail concerning a modification brought to an elastic fastening device.

As a modification of the structure described hereinabove and as shown in FIG. 9, an oblique resilient inclined washer 63 contained in a frame 64 welded to the flange 57 may be substituted for the hooks or clamps 59, this washer 63 engaging the inner face of flange 58 of inner face 19.

Figure 10:
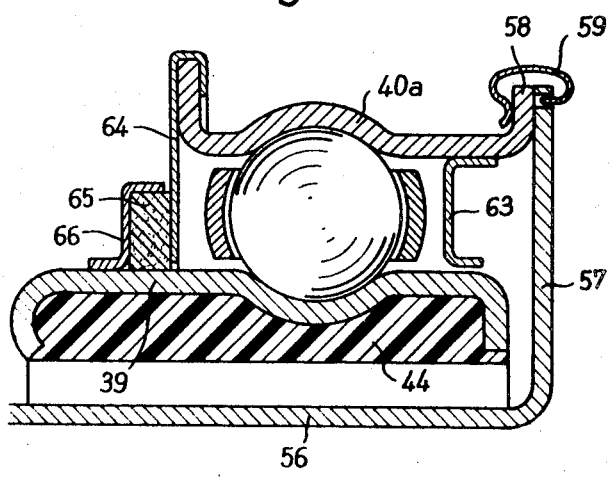
FIG. 10 shows an integral self-centering bearing wherein the external control effort is transmitted to the inner race.

The same construction is also applicable to the self-centering thrust bearing illustrated in FIG. 10 wherein the inner race 39 is filled with a suitable elastomeric material 44 and adapted to transmit the clutch release effort, the flange 57 of guide member 56 being resiliently connected to the outer race 40a having an extension at the rear end of the bearing. In this case the two elastic connecting means described hereinabove in connection with FIGS. 9 and 10 may also be used.

This bearing comprises a baffle member 63 disposed between the rear portions of the pair of races and another baffle member 64 at the front end of the bearing which surrounds the outer race 40a. An annular seal or packing 65 enclosed in a sheath or casing 66 is provided on the projecting front portion of inner race 39.

Figure 11:
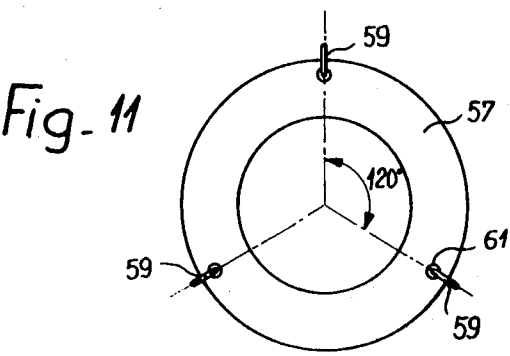
FIGS. 11 and 12 are axial views showing two different forms of embodiment of elastic clamps of clutch bearings.
Figure 12:
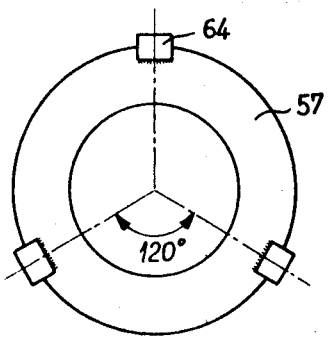

FIGS. 11 and 12 illustrate the former the resilient assembling of parts by means of hook members 59 and the latter the assembling of parts by means of split washers 64; as shown, this assembling step may be carried out by using three sets of clamps or like members spaced 120° apart on the outer periphery of the bearing.

It will readily occur to anybody conversant with the art that various modifications and changes may be brought to the specific forms of embodiment of the present invention which are shown and described herein, without departing from the spirit and scope of the invention as set forth in the appended claims.

I claim:

1. A self-centering integral ball thrust clutch bearing comprising at least two rolled steel sheets with ball races impressed therein forming inner and outer races, a clutch mechanism having a transmission shaft and a control member, a carrier and guide member mounted on said transmission shaft and cooperating with said control member, and a thrust bearing control member cooperating with said mechanism to withdraw the clutch, the ends of each said sheet being bent to constitute spaced end walls with a cavity therebetween, a vibration damping resilient material filling at least one of said cavities, said carrier and guide member having a flange receiving the clutch mechanism control member, assembly means to apply said end walls against said flange, and at least one of the damping material filled cavities being spaced from said carrier member for self-centering of the thrust bearing by means of said thrust bearing control member.

2. A clutch bearing according to claim 1, further comprising baffle means crimped in said end faces.

3. A clutch bearing according to claim 1, wherein the cavity formed in the sheet having the inner race is filled with a self-lubricating and vibration-damping elastomeric synthetic material.

4. A clutch the according to claim 1, further comprising a plate secured to the inner race and adapted to be engaged by the clutch control member.

5. A clutch bearing according to claim 4, wherein said flange of the carrier and guide member is resiliently connected to the end face of the bent end portion of at least one of said sheets.

6. A clutch bearing according to claim 5, wherein said resilient connection of said flange to said end face comprises elastic clamp means engaging said flange and bearing against the end face of said bearing race.

7. A clutch bearing according to claim 5, wherein said resilient connection of said flange to said end face comprises at least three resilient members disposed at spaced angular intervals along the outer periphery of said flange.